J. L. HUGHES.
LOCK FOR STEERING WHEELS OF AUTOMOBILES.
APPLICATION FILED FEB. 20, 1917.
1,243,941.
Patented Oct. 23, 1917.
2 SHEETS—SHEET 2.
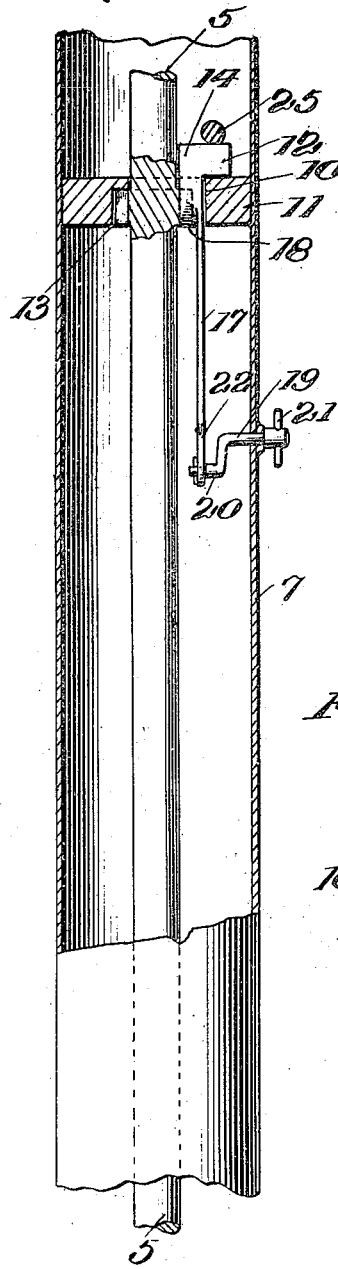
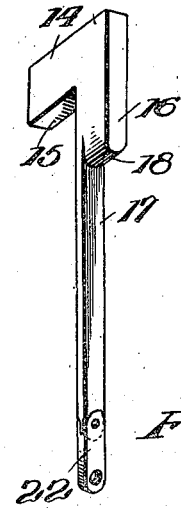
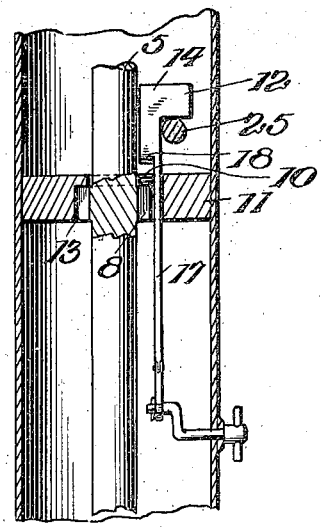
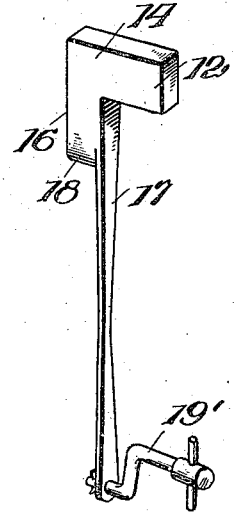
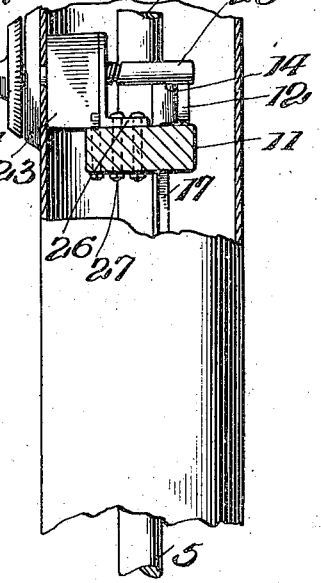
Inventor
John L. Hughes
By
Adams Lacey, Attorneys

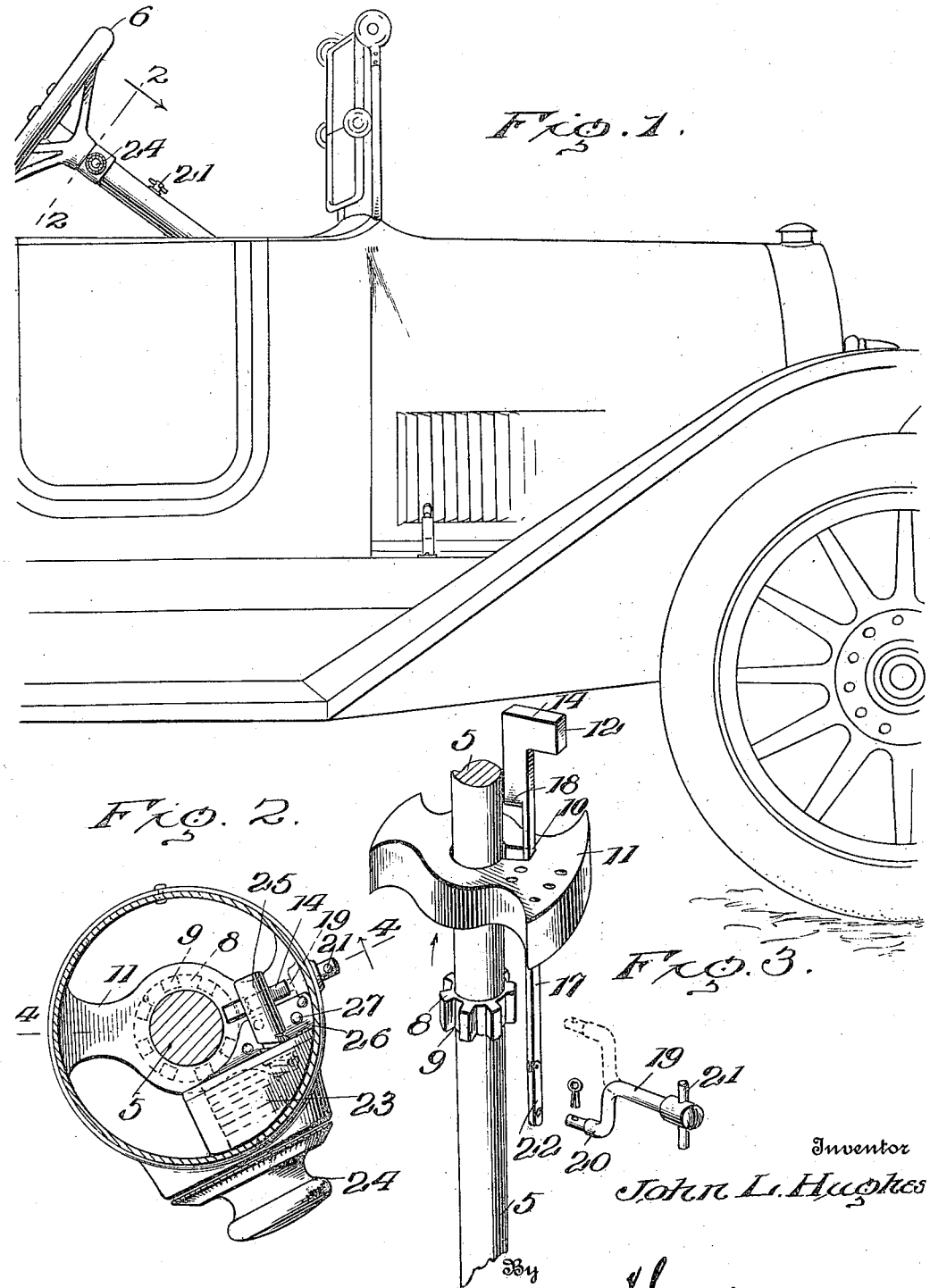

UNITED STATES PATENT OFFICE.

JOHN L. HUGHES, OF TULSA, OKLAHOMA, ASSIGNOR OF ONE-HALF TO ISAAC SHULER, OF TULSA, OKLAHOMA.

LOCK FOR STEERING-WHEELS OF AUTOMOBILES.

1,243,941.

Specification of Letters Patent.  Patented Oct. 23, 1917.

Application filed February 20, 1917.  Serial No. 149,900.

*To all whom it may concern:*

Be it known that I, JOHN L. HUGHES, a citizen of the United States, residing at Tulsa, in the county of Tulsa and State of Oklahoma, have invented certain new and useful Improvements in Locks for Steering-Wheels of Automobiles, of which the following is a specification.

This invention relates to locks for automobiles and more particularly to means for locking the steering wheel against rotation.

The object of the invention is to provide a lock of simple and durable construction capable of being readily attached to the steering column of an automobile and by means of which the steering wheel thereof may be securely locked in a predetermined position so as to prevent an unauthorized person from driving the car or turning the front wheels thereof in case an attempt is made to surreptitiously steal the car by towing or otherwise.

A further object is to provide a lock including a vertically movable detent adapted to enter any one of a series of locking recesses in a collar on the steering column or post whereby, when the detent is moved to operative position into engagement with any one of said recesses, the post and steering wheel carried thereby will be locked against rotation.

A further object is to provide manually operable means for raising and lowering the detent, and means for locking said detent in both raised and lowered positions.

A further object is to so construct the stem of the detent that should an attempt be made to dislodge the locking bolt by forcibly raising the detent, the stem of said detent will either bend or break and thus effectually prevent release thereof.

A still further object of the invention is generally to improve this class of devices so as to increase their utility, durability and efficiency, as well as to reduce the cost of manufacture.

Further objects and advantages will appear in the following description, it being understood that various changes in form, proportions and minor details of construction may be resorted to within the scope of the appended claims.

In the drawings:

Figure 1 is a side elevation of a portion of an automobile, showing the improved lock applied to the steering column thereof;

Fig. 2 is a transverse sectional view taken on the line 2—2 of Fig. 1 and looking in the direction of the arrow;

Fig. 3 is a perspective view of a portion of the steering post, spider and detent detached;

Fig. 4 is a vertical sectional view taken on the line 4—4 of Fig. 2, showing the detent in lowered position and the steering post locked against rotation;

Fig. 5 is a similar view, showing the detent elevated to permit the steering wheel to be manipulated in the usual manner;

Fig. 6 is a detail perspective view of the locking detent detached;

Fig. 7 is a side elevation partly in section, showing the manner of securing the lock to the spider;

Fig. 8 is a perspective view of the detent, showing the crank arm connected directly to the stem thereof.

Corresponding and like parts are referred to in the following description and indicated in all the views of the drawings by the same reference characters.

The improved lock forming the subject matter of the present invention is shown applied to the steering mechanism of an automobile of the usual construction in which 5 designates the steering post, 6 the steering wheel, and 7 the steering column, as shown. Formed on the steering post 5, preferably immediately below the wheel 6, is a collar 8 having a plurality of radiating locking recesses 9 adapted to register with a slot 10 formed in a spider or support 11 to permit the passage of a detent 12. The spider 11 is keyed or otherwise rigidly secured to the column 7, while the opposite sides thereof are preferably cut-away to accommodate the spark rod, throttle tube, and the like.

Formed in the lower face of the spider or support 11 is a circular recess 13 which receives the collar 8 and permits the post 5 to normally freely rotate therein, in the usual manner, to effect the steering of the automobile. The detent 12 is provided with an enlarged head 14 having a flat lower face 15 defining a reduced extension 16, said extension terminating in a depending stem 17. The extension 16 of the head is preferably of substantially the same size as the slot 10 and is so arranged that when the detent is lowered, said extension will enter one of the locking recesses 9 and thus effectually lock the steering column and wheel against rotation. The lower face of the extension 16 is preferably curved or rounded at 18 so as to assist in guiding the extension into the locking recesses 9.

Journaled in the column 7, immediately below the spider 11, is a stub shaft 19, the inner end of which is provided with a crank arm 20 and the outer end thereof with a finger piece or handle 21. The crank arm 20 is pivotally connected to the lower end of the stem 17 through the medium of a link 22 so that by rotating the finger piece 21, the detent 12 may be elevated to disengage the extension 16 thereof from the recesses 9 and thus permit rotation of the steering wheel. Arranged within the column 7 above the spider or support 11 is a permutation lock 23, the dial 24 of which is preferably disposed on the outside of the sleeve and within easy reach of the operator of the car so that by rotating the dial 24 the bolt 25 of said lock may be moved into engagement with either side of the head of the detent 12 and thus lock said detent in either raised or lowered position. The casing of the lock 23 is preferably provided with an anchoring flange 26 which is rigidly secured to the spider 11 by bolts or similar fastening devices 27 so that should an attempt be made to release the bolt 25 by breaking off the dial 24 with a chisel or other tool, said bolt 25 will be held in engagement with the detent by said casing, as best shown in Fig. 7 of the drawings. In order to lock the steering wheel and post against rotation, it is merely necessary to turn the handle or finger piece 21 in one direction when the head of the detent 12 will be lowered, thereby causing the extension 16 to enter the adjacent locking recess 9 in the collar on the steering post. After the head of the detent has been moved to lowered position, the lock 23 is actuated so as to cause the bolt 25 thereof to bear against the upper face of the head of the detent, as best shown in Fig. 4 of the drawings, thereby locking the detent against vertical movement and effectually preventing rotation of the steering wheel. The stem 17 of the detent is preferably made relatively thin so that after the detent is locked in lowered position any attempt on the part of an unauthorized person to dislodge the bolt 25, by forcing the detent upwardly, will result in either bending or breaking the stem 17 and thus prevent further movement of the detent.

In order to permit the steering wheel to be used in the ordinary manner, the locking bolt 25 is retracted and the finger piece 21 turned in the opposite direction which elevates the detent until the extension 16 thereof clears the recesses 9 and slot 10 and in which position the detent may be held against further movement by operating the lock 23 to cause the bolt 25 thereof to engage the flat lower face 15 of the head of the detent, as best shown in Fig. 5 of the drawings. When the parts are in this position, the steering post is free to turn within the column 7, in the usual manner, as before stated.

It will of course be understood that by rotating the steering wheel until the front wheels of the automobile assume an angle to the body thereof and lowering the detent, the front wheels of the vehicle may be locked in such position so as to effectually prevent a person from stealing the car by towing or otherwise. It will further be understood that a pin lock or other type of lock may be substituted for the permutation lock 23, if desired.

In Fig. 8 of the drawings, I have shown the stem of the detent made relatively narrow and the crank arm 19' connected directly to said stem, thus dispensing with the link 22, there being sufficient play of the stem of the detent to cause the crank arm to raise and lower said detent when the finger piece or handle is rotated. It will of course be understood that either the link or solid stem may be employed without departing from the spirit of the invention.

It will thus be seen that all of the salient parts of the lock are entirely housed within the column 7 so as to prevent the lock from being operated by a person other than one familiar with the combination, and that any attempt made by an unauthorized person to release the steering wheel, either by mutilating the dial of the lock 23 or by forcing the detent upwardly against the bolt 25, will prove futile.

The lock is extremely simple in construction and may be readily applied to all steering columns now in use without necessitating any material change in the structural parts thereof.

Having thus described the invention, what is claimed as new is:

1. The combination with a steering column, and a steering post disposed within the column and provided with a collar having radiating recesses formed therein, of a spider rigidly secured within and extending across the column and provided with a seating recess for housing the collar, a detent longitudinally movable through the spider and adapted to enter one of the recesses in the collar to lock the post against rotation, and manually operable means carried by the collar and connected with the detent for disengaging the detent from the recesses in the collar.

2. The combination with a steering column, and a steering post disposed within the column and provided with a collar having a series of radiating recesses formed therein, of a spider secured rigidly within and across the column and having a seating recess for housing the collar, said spider being provided with a slot adapted to register with any one of the recesses within the collar, a longitudinally movable detent slidably mounted in the slot in the collar and adapted to engage a recess in the collar to prevent rotation of the post, and means connected with the detent to disengage the same from the collar.

3. The combination with a steering column, and a steering post disposed within the column and provided with a collar having a series of radiating recesses, of a spider secured within and extending across the column and having a bearing recess for housing the collar, there being a slot formed in the spider and communicating with said bearing recess, and a detent slidably mounted in the slot and having a reduced portion to enter one of the recesses in the collar for locking the post against rotation.

4. The combination with a steering column, of a steering post disposed within the column and provided with radiating recesses, a spider secured within the column, a detent movable longitudinally through the spider and adapted to enter one of the recesses in the post for locking the latter against rotation, said detent being provided with a depending weakened stem, and a manually operable device carried by the column and connected with the stem to disengage said detent from the post to permit rotation thereof.

5. The combination with a steering column, of a steering post disposed within the column and provided with a collar having radiating recesses formed therein, a spider secured to the column and having its opposite sides cut-away and its lower face provided with a seating recess for the reception of the collar, there being a slot extending through the spider and communicating with the seating recess, a vertically movable detent slidably mounted in the slot and adapted to engage one of the recesses in the collar, and a finger piece connected with the detent for elevating the same out of engagement with the recesses in the collar to permit rotation of the post.

6. The combination with a steering column, of a steering post disposed within the column and provided with a collar having radiating recesses formed therein, a spider secured to the column and having a seating recess for the reception of the collar, there being a slot formed in the spider and communicating with the seating recess, a vertically movable detent operating in the slot and provided with a depending reduced portion adapted to enter one of the recesses in the collar, said reduced portion being provided with a curved terminal defining a depending stem, and a crank arm journaled in the column and operatively connected with the stem for elevating the detent.

7. The combination with a steering column, and post, of a spider secured within and across the column, a longitudinally movable detent operating in the spider and adapted to engage the steering post for locking the latter against rotation, said detent being formed with a head, and a lock, the bolt of which is adapted to engage one side of the head for holding the detent out of engagement with the steering post when the detent is elevated and adapted to engage the other side of the head of the detent and hold said detent in engagement with the post when the detent is lowered.

8. The combination with a steering column, of a steering post disposed within the column and provided with a collar having radiating recesses formed therein, a spider secured to the column and provided with a seating recess for the reception of the collar, said spider being provided with a vertical slot, a vertically movable detent operating within the slot and provided with a depending stem and an enlarged head, a crank arm journaled in the column and operatively connected with the stem of the detent for elevating the latter, and a lock disposed above the spider and including a casing rigidly secured to the spider and provided with a bolt adapted to engage one side of the head of the detent for holding the detent in elevated position and adapted to engage the other side of the head of the detent for holding said detent in lowered position.

9. The combination with a steering column, of a steering post disposed within the column and provided with a collar having radiating recesses formed therein, a support secured to the column and having its lower face provided with a seating recess for the reception of the collar, said support being formed with a slot, a detent slidably mounted in the slot and provided with a head having a reduced portion adapted to engage one of the recesses in the collar and provided with a depending relatively thin stem, and a crank arm journaled in the column and operatively connected with the stem of the detent.

10. The combination with a steering column, and a steering post disposed within the column, of a spider secured within the column around the post and having a longitudinally extending opening, a detent slidably mounted in said opening and provided at one end with an enlarged head adapted at one side to rest upon the spider and at its opposite side to engage the steering post to prevent rotation of the same, means for shifting said detent longitudinally whereby it will be moved into or out of engagement with the post, and a lock carried by the column and provided with a bolt adapted to engage under the head of the detent to hold it out of engagement with the post or above the said head whereby one side of the head will be held against the spider and the other side thereof will be held in engagement with the steering post.

11. The combination with a steering post, and a steering column surrounding the post, of a support secured within the column and having an axial opening, a detent slidably mounted in said opening and having a head provided with a flat face at one side to bear against said support and provided at its other side with a projection adapted to engage the steering post and prevent rotation of the same when the flat face of the head bears upon the support, and a bolt mounted in the column and movable across the head to engage either side of the same and thereby hold it in or out of engagement with the steering post.

In testimony whereof I affix my signature.

JOHN L. HUGHES. [L. S.]

Copies of this patent may be obtained for five cents each, by addressing the "Commissioner of Patents, Washington, D. C."